Figure 1:
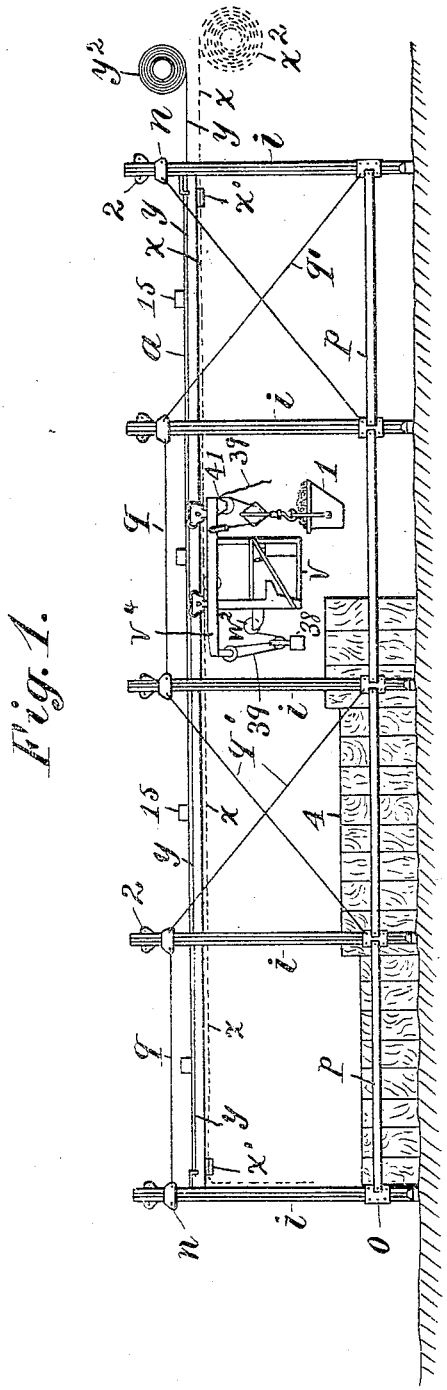

A. LAMBERT.
SEMI-PORTABLE HOISTING AND CONVEYING APPARATUS.
APPLICATION FILED FEB. 25, 1909.

948,281.

Patented Feb. 1, 1910.

7 SHEETS—SHEET 1.

Witnesses:
L. Lee.
J. W. Greenbaum.

Inventor.
Asher Lambert, per
Thomas S. Crane, Atty.

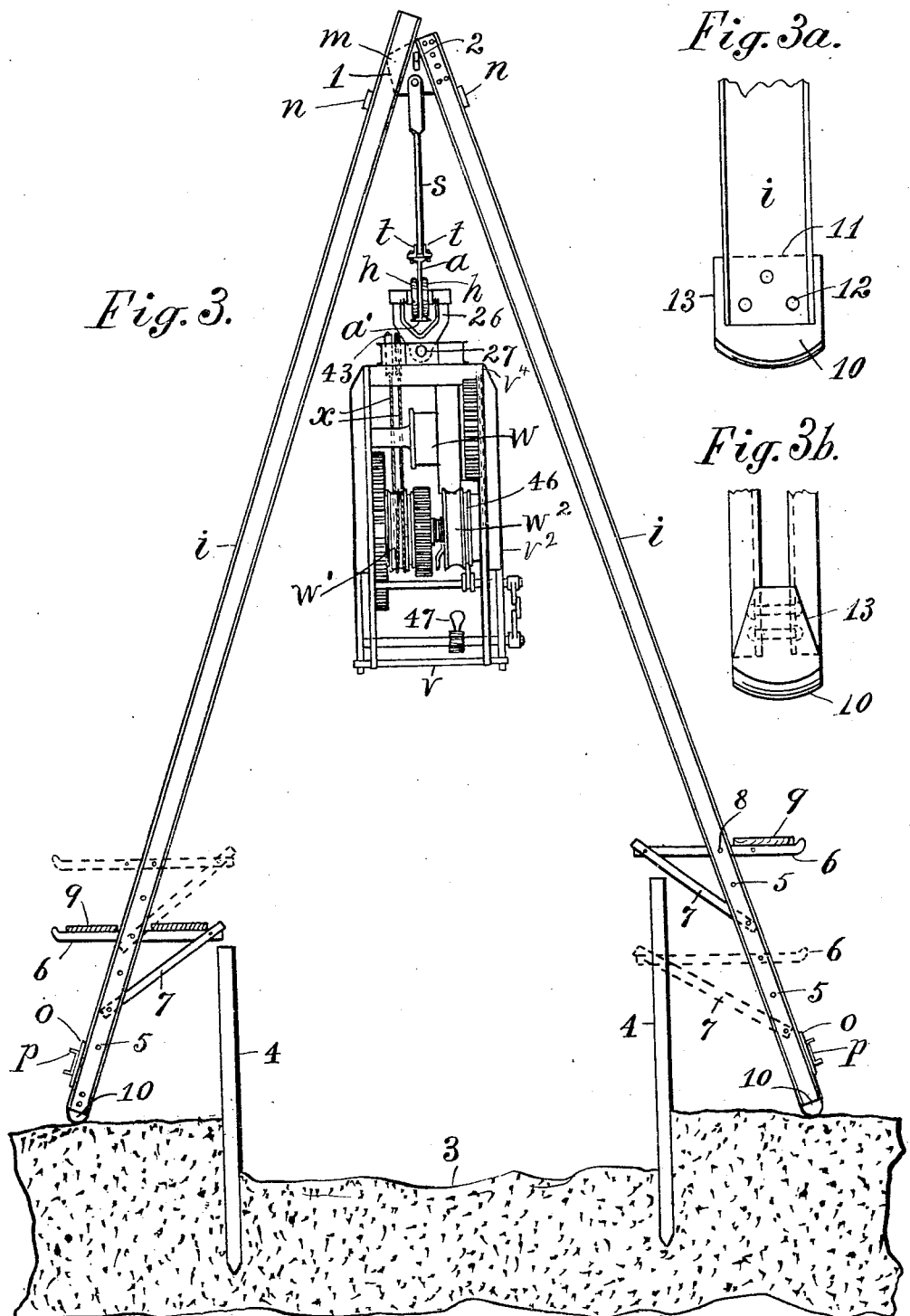

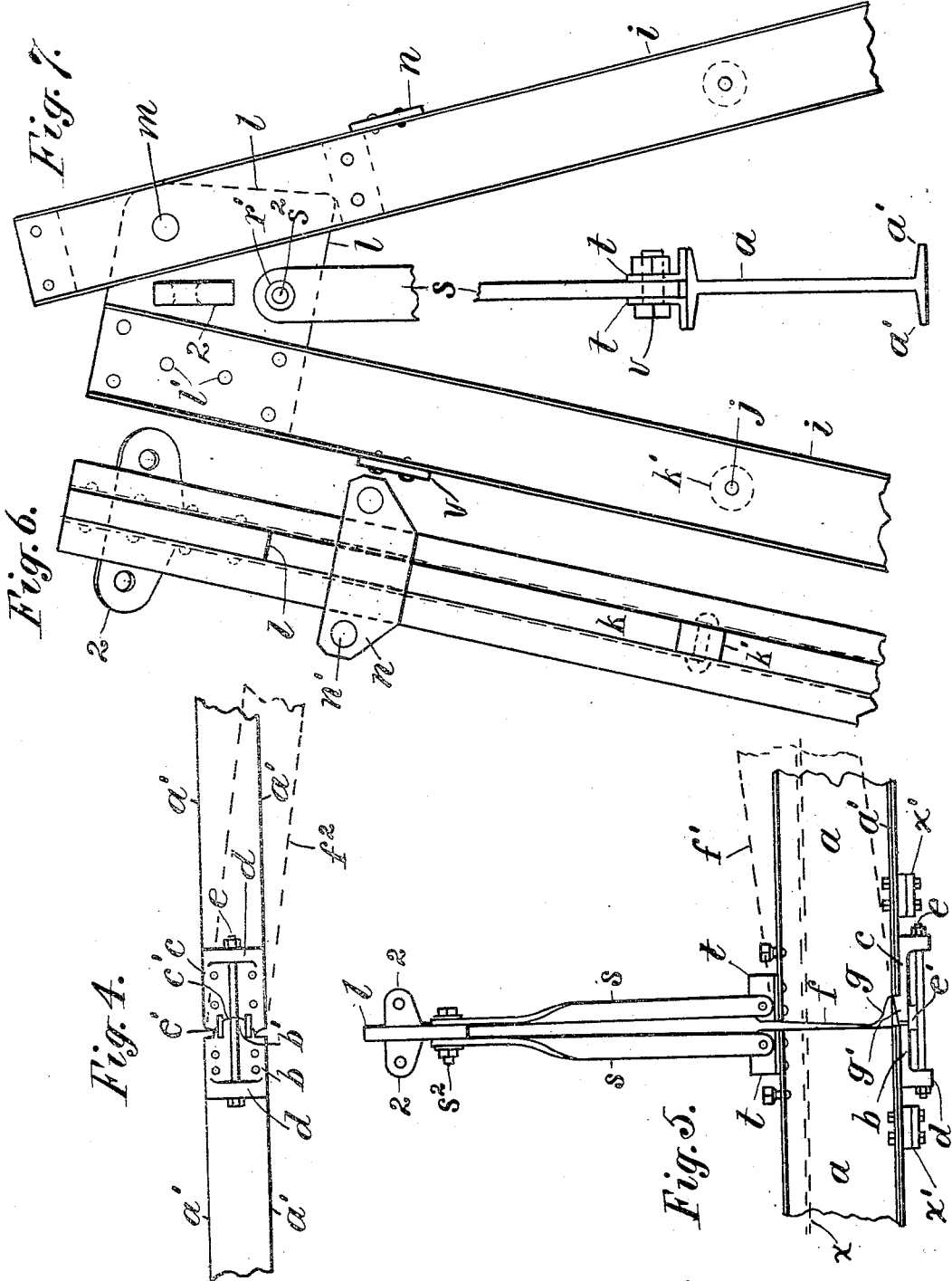

A. LAMBERT.
SEMI-PORTABLE HOISTING AND CONVEYING APPARATUS.
APPLICATION FILED FEB. 25, 1909.
948,281.
Patented Feb. 1, 1910.
7 SHEETS—SHEET 4.
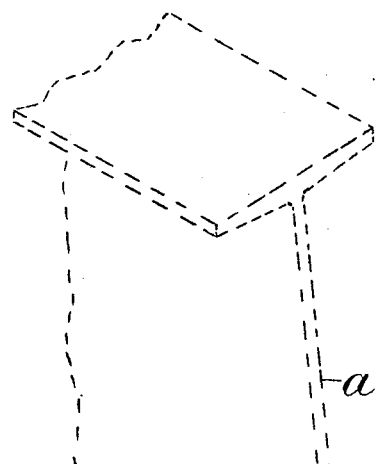
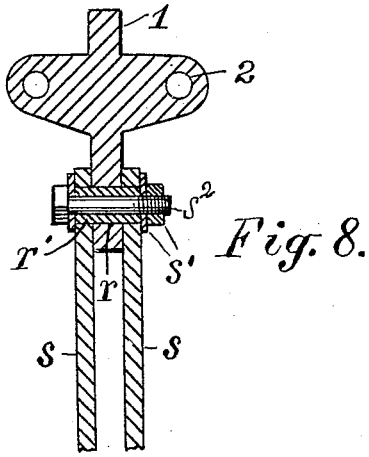
Fig. 8.
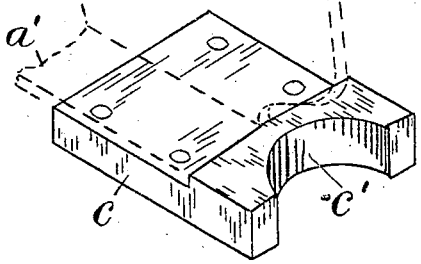
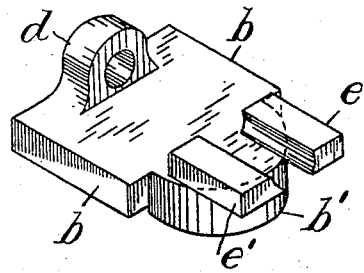
Fig. 9.
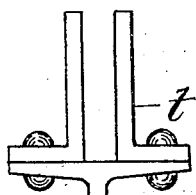
Fig. 10.
Fig. 11.
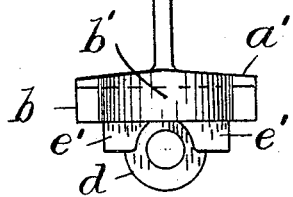
Witnesses:
L. Lee
J. W. Greenbaum
Inventor.
Asher Lambert, per
Thomas S. Crane, Atty.

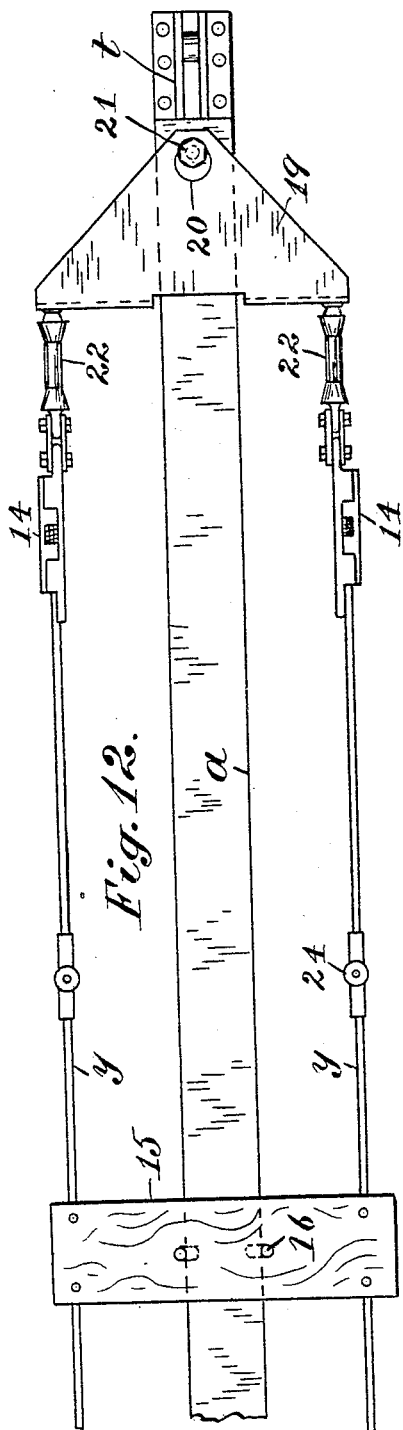
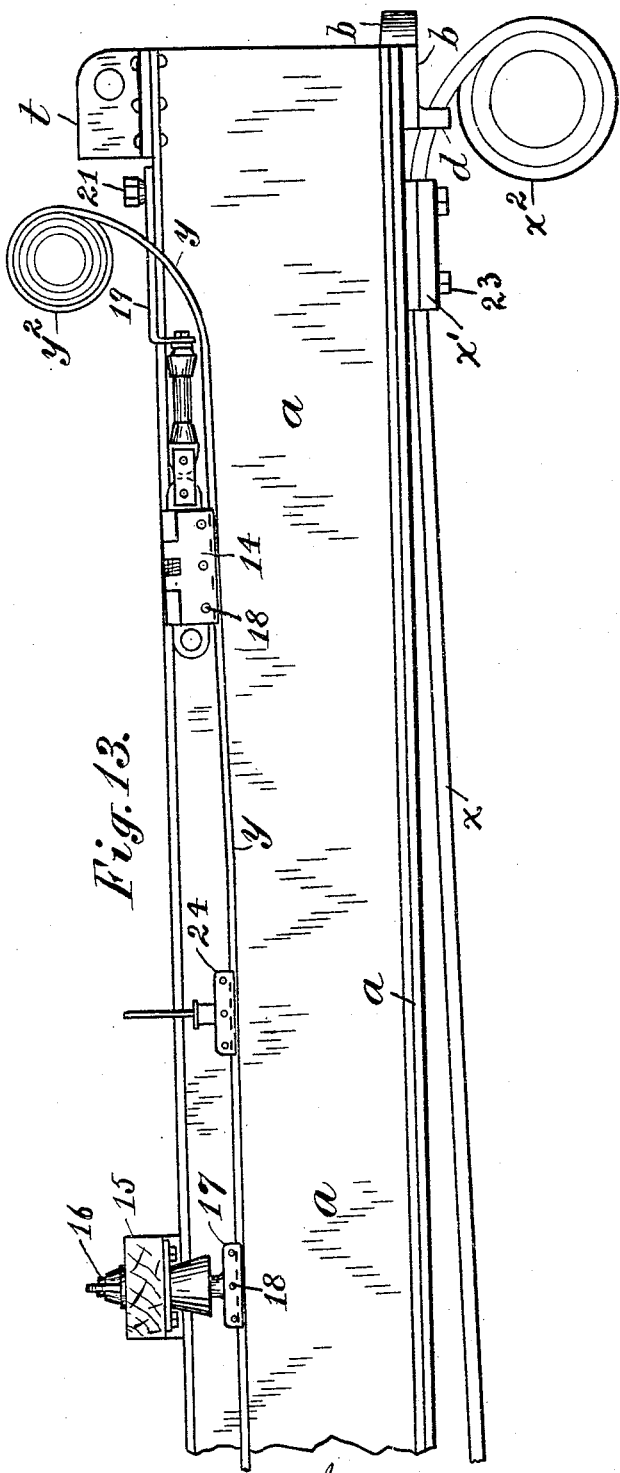

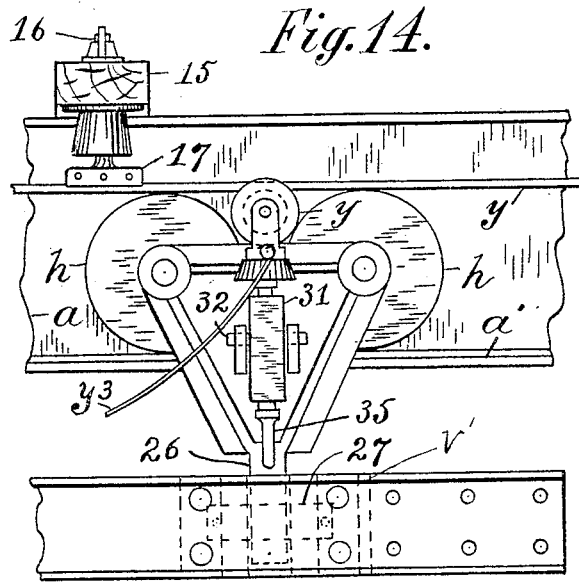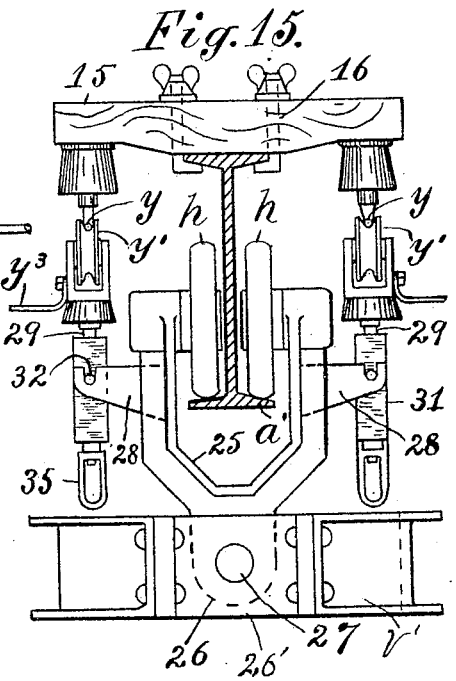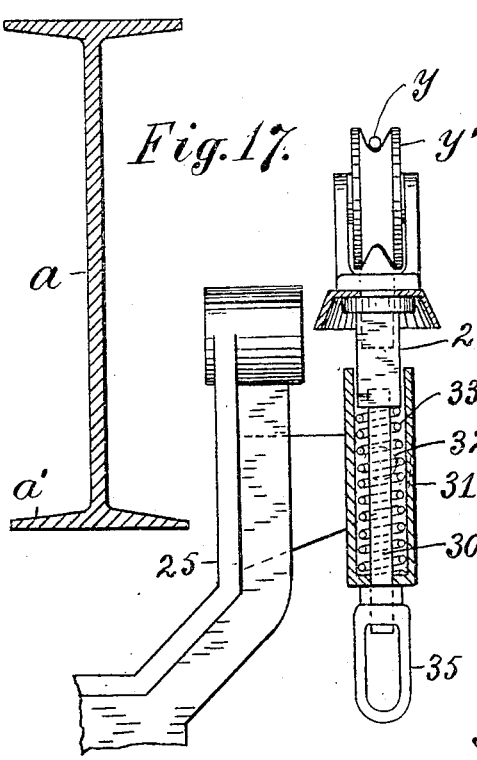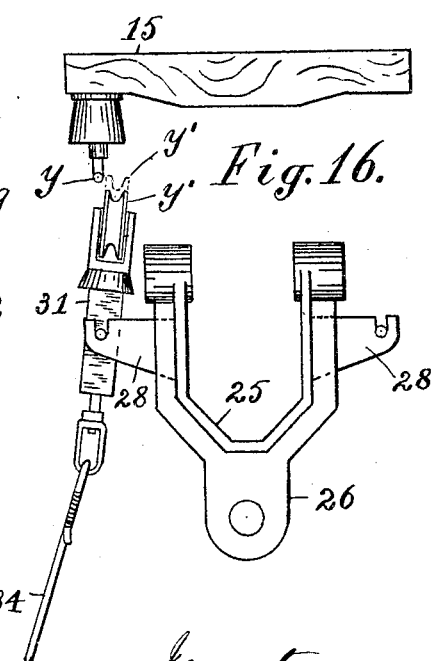

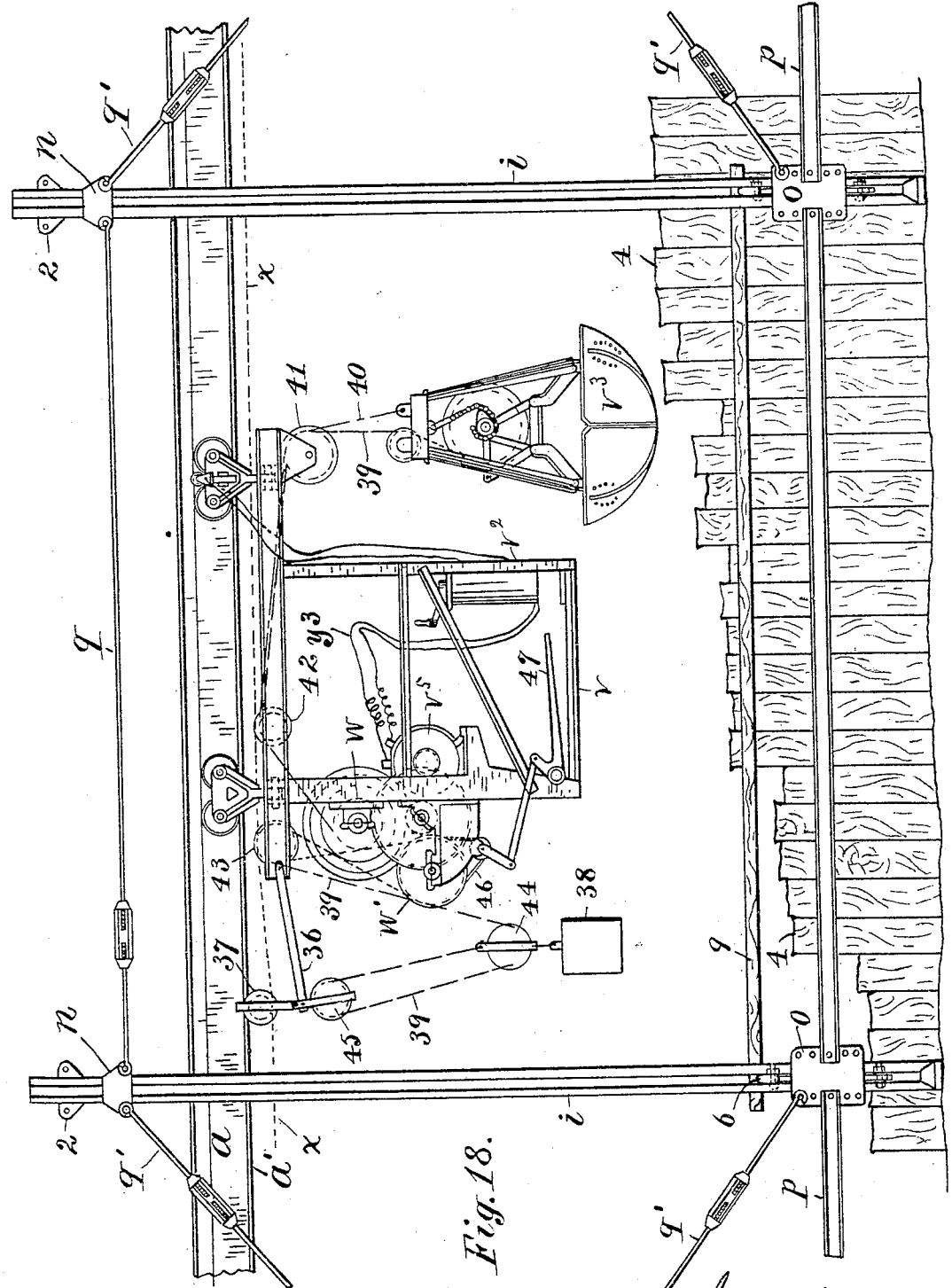

UNITED STATES PATENT OFFICE.

ASHER LAMBERT, OF NEWARK, NEW JERSEY.

SEMI-PORTABLE HOISTING AND CONVEYING APPARATUS.

948,281.  Specification of Letters Patent.  Patented Feb. 1, 1910.

Application filed February 25, 1909. Serial No. 479,877.

*To all whom it may concern:*

Be it known that I, ASHER LAMBERT, a citizen of the United States, residing at No. 1 Johnson avenue, Newark, county of Essex, and State of New Jersey, have invented certain new and useful Improvements in Semi-Portable Hoisting and Conveying Apparatus, fully described and represented in the following specification and the accompanying drawings, forming a part of the same.

This invention provides an overhead track of very moderate length for a conveyer and hoister which can be erected over a portion of the ground where excavation or other work is to be performed and can be gradually advanced as the work progresses, thus saving the expense of erecting a long cableway or other support for a hoisting or conveying truck, and wholly avoiding the anchorage required at each end of a cable track.

The present construction is to furnish a series of interchangeable track-bars with a series of interchangeable supports and means for hanging the joints of the track-bars from the supports so that an overhead track can be erected in sections for supporting a conveyer or excavator, thus permitting, as the excavation or other work beneath such track-bars is completed, the rear sections to be taken down successively and advanced one at a time to the forward end of the series. The track-bars are made of I-shape or other suitable form so that truck-wheels can be supported upon their lower flanges, and the invention includes the connection of the track-bars at their adjacent ends so that they may tip laterally and vertically and thus accommodate themselves automatically to various curves and grades where they are erected.

The supports of the track-bars may be of any desired character, the form shown herein consisting of an A-frame having each leg formd with two channel-bars, a joint-block connecting the tops of the legs, a spherical shoe applied to the bottom of each leg to rest upon the ground, and plates secured upon the outer sides of the legs near the top and bottom for connecting tie-bars and brace-rods thereto.

The A-frames are made interchangeable, and by the use of suitable tie-bars and brace-rods a series of such frames may be erected and held rigidly in position to support the track-bars. The joints of the interchangeable track-bars are arranged beneath the joint-blocks of the A-frames and may be connected thereto by separate links or by other means which will permit the flexure of the track-bar joints in a vertical or horizontal direction respectively.

An electric motor is preferably used upon the hoisting truck, and a hoisting-drum and shifting-drum actuated thereby, and a shifting-rope is secured detachably at opposite ends of the series of track-bars and wound around such shifting-drum to shift the truck when such drum is rotated. The trolley wire in like manner is detachably secured at opposite ends of the series of track-bars and supplies the electric motor with current by a trolley contact, and such shifting-rope and trolley-wire are supported so as to avoid shifting them longitudinally from time to time as the sections of track-bars and A-frames are progressively advanced.

The invention will be understood by reference to the annexed drawing, in which—

Figure 2:
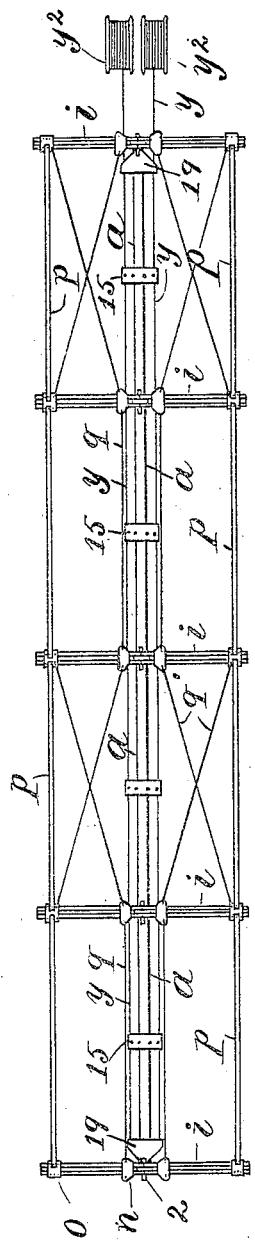

Figure 1 is a side elevation, and Fig. 2 a plan of four sections of the track-bars with the five A-frames required to support the same, the view being upon a very small scale. Fig. 3 is a view upon a much larger scale of one of the A-frames erected over a trench with the parts supported thereby; Fig. 3ª is a side view and Fig. 3ᵇ an edge view of the bottom of the leg *i* Fig. 4 shows the under side of two track-bars at their joint; Fig. 5 is a side elevation of the track-bars at their joint with their suspending connections; Figs. 6 and 7 show the joint at the top of an A-frame, Fig. 6 showing the outer side of the leg which carries the joint-block, and Fig. 7 an elevation of the two legs connected to such block. Fig. 8 is a cross section of the joint-lock for the A-frame with parts of the suspending links thereon; Fig. 9 is a perspective view of the hinge-block *c* viewed from the upper side; Fig. 10 is a perspective view of the hinge-block *b* viewed from the lower side; Fig. 11 is an end view of one of the track-bars; Fig. 12 is a plan and Fig. 13 a side view of a track-bar with the cable and trolley wire attachments. Fig. 14 is a side view, and Fig. 15 an end view of one of the carriage trucks and trolley connections. Fig. 16 shows a part of Fig. 15, with the trolley-carrier tipped to detach the trolley from the wire. Fig. 17 shows the trolley-carrier upon a larger scale in section at the center line where hatched. Fig. 18 is a side elevation of one section of the entire apparatus with the housing carried thereon.

$a$ designates the interchangeable sections of track-bars, the bottom flange $a'$ of which is provided at opposite ends with flat or horizontal hinge-lugs $b$ and $c$ of complemental character, the lug $b$ having a semi-circular hinge projection $b'$ with center at the end of the bar, and the lug $c$ having a semi-circular notch or hinge-socket $c'$ adapted to receive the projection $b'$. Bolt-lugs $d$ are projected from the under sides of the lugs $b$ and $c$, and a bolt $e$ extended through such bolt-lugs enables the hinge projection $b'$ to be held closely in the hinge-socket $c'$. Over the hinge-joint $c'$ the flange $a'$ of the track-bar is cut away at $g$, and the end of the track-bar above such cut-away portion is beveled backwardly, as at $f$ in Fig. 5, to permit an angular adjustment of the bars in a vertical plane, as indicated by the dotted lines $f'$ in Fig. 5. The form of hinge-lugs also permits an angular adjustment in a horizontal plane, as indicated by dotted lines $f^2$ in Fig. 4. The upper surface of the hinge-lug $c$ beneath the notch $g$ is extended upwardly and has a seat $g'$ flush with the upper surface of the flange $a'$, as shown in Fig. 5, thus enabling the truck-wheels $h$ which are supported upon such lower flange to run smoothly over the joint of the rails, whether they are deflected upwardly or laterally.

Each of the A-frames has two legs formed each of two channel-bars $i$ connected together by bolts $j$, with an interspace $k$ in which thimbles $k'$ are inserted at some points. The legs of each frame are hinged together at the top by a hinge-block $l$ having a plate which is secured between the bars of one leg by rivets $l'$, and jointed between the bars of the opposite leg by a pivot-bolt $m$ extended through such bars and the plate. This pivotal connection permits the bottom of the legs to be set at any distance apart. Brace-plates $n$ are shown secured upon the outer sides of the legs near the top with eyes or holes $n'$ for connecting brace-rods, and larger plates $o$ are shown secured upon the outer sides of the legs near the bottom, to which tie-bars $p$ can be connected as well as brace-rods $q'$ which connect the plates $n$ and $o$ in the alternate spaces, while horizontal brace-rods $q$ connect the plates $n$ in the intermediate spaces. A bored hole $r$ is formed through the hinge-block $l$ between the legs $i$, and a bushing $r'$ is fitted tightly therein and projected at opposite sides to receive separate links $s$, which are held in place thereon by washers and nuts $s'$ at the opposite ends of a bolt $s^2$ inserted through the bushing. The rigidity of the bushing holds the links much more firmly than a mere bolt, while it permits their detachment by merely removing the bolt. The links are jointed at their lower ends to blocks $t$ riveted upon the top flanges of the track-bars $a$ at their ends, thus supporting the beams movably and permitting them to tip vertically and laterally, while holding their adjacent ends at a common level, thus enabling the truck-wheels to pass smoothly over the flanges $a'$ and seats $g'$.

To facilitate the adjusting of the ends of the track-bars together and to hold the flanges $a'$ at the same level, two studs or ears $e'$ are formed upon the under side of the projecting hinge-lug $b'$ and projected beneath the end of the hinge-block $c$.

Fig. 1 shows the arrangement of five A-frames connected near the bottoms by the horizontal tie-bars $p$ and braced by the rods $q$ and $q'$, and the track-bars suspended under the apex of each frame. It is obvious that this construction supports the A-frames erectly, while it permits the feet of the A-frames to adapt themselves to inequalities of the surface upon which they are supported.

A hoisting-truck is shown in Figs. 1 and 3 carried by the truck-wheels $h$, pairs of which rest upon the upper surfaces of the flange $a'$ at opposite sides of the track-bars $a$, as shown in Fig. 3. The hoister frame, as shown in Figs. 3 and 18, is formed with bottom bars $v$, upright bars $v^2$ and top bars $v^4$.

An electric motor $v^5$ is shown in the frame of the hoister, and a hoisting-drum $w$ and shifting-drum $w'$ which, in practice, are connected with such motor, although all of the connecting gears are not fully shown herein on account of the smallness of the scale, and because they are already well known, and form no part of the present invention.

A shifting-rope $x$ is shown secured by clamps $x'$ to the track-bars at opposite ends as shown in Fig. 13, and a coil $x^2$ of such rope wound around the hoisting-drum, so that when the drum is rotated by the motor the truck is propelled along the track-bars. The rope $x$ is passed through the clamps $x'$, as shown in Fig. 13, and a coil $x^2$ of such rope (shown diagrammatically in such figure and in Fig. 1) may be placed at the head of the series of track-bars when the sections are first erected, the rope being gradually unwound from the coil and applied to the clamps which are successively fixed to the track-bar at the forward end of the series. As the track-bars are taken down from the rear end of the series and advanced to the front end of the series, a portion of the rope in the rear of the track-bars is left projecting or hanging down and the rope is thus maintained upon the shifting-drum and upon the track-bars that are erected, without removing it from any of the track-bars that are in use. Two electric trolley wires $y$ for the positive and negative current are shown secured upon the track-bars in like manner with the wire extended through clamps 14 near the ends of the track-bars and held detachably in such clamps so that they can be released from the track-bars that are taken down from the rear end of the series. A coil $y^2$ of such trolley wire is indicated in Fig. 1 and in Fig. 13 which would be placed at the beginning of the series like the coil of shifting-rope and gradually unwound and applied to the clamps 14 upon the track-bars that are erected at the head of the series.

An insulator support 15 is shown in Figs. 13 and 15 secured detachably to the top of the track-bar by hook-bolts 16, and insulated clamps 17 are carried by the support 15 to hold the trolley wire intermediate to the ends of the track-beam; bolts 18 being used in the clamps 14 and 17 to secure the wire when adjusted. To facilitate the removal of these attachments from the beam when it is taken down, the clamps 14 for the two trolley wires are shown in Figs. 12 and 13 attached to a flat connector 19 having a hole 20 in one end to slip over a bolt-head 21 which is secured permanently in the top of the track-bar near the block $t$. The clamp 14 is shown attached to the connector 19 by an insulator 22. Both ends of each track-bar are provided with the bolt 21 and with holes for the bolts 23 by which the clamps $x'$ can be detachably secured, and the clamps can thus be readily removed from and applied to either end of the beam as occasion may require. The clamp 14 can be secured to the connector 19 by any suitable means for tightening the trolley wire, as for instance a turn-buckle.

Detachable junction-clamps 24 are shown in Figs. 12 and 13 upon the trolley wires to connect them with the wires which supply the current. It will thus be seen that when a portion of the sections are removed from the rear end of the series and erected at the front end, it is not necessary to take down the shifting-rope or the trolley wires over all of the sections, nor to move such rope and trolley wire forward as the sections are advanced; but the advance portions of such rope and wire are furnished from reserve coils and the portions that are disused are allowed to hang idly from the rear end of the structure.

Figs. 14 to 17 show means for supporting a trolley $y'$ at each side of the hoister carriage truck 25. Two of these trucks are used each having a lug 26 at the bottom pivoted transversely in the top of the hoister-frame by a pin 27, thus avoiding any lateral strain upon the trucks when the hoister-frame is pulled sidewise in raising loads not directly beneath the track-bars. The pin 27 is supported by brackets 26' inserted laterally between the top bars $v$ of the hoister-frame. The truck is forked and carries two of the wheels $h$ in each side, and arms 28 are projected from opposite sides of the truck to form bearings for the trolley-carriers. Such carrier is formed with a square head 29 and a round stem 30, both fitted in a box 31 which is journaled upon the arms by rivets 32. The trolley-carrier is pressed nearly upward by a spring 33 and may be pulled down by a cord 34 attached to an eye 35 at its lower end.

Fig. 16 shows the carrier pulled down, thus clamping the trolley wheel $y'$ from the trolley wire and enabling the carrier to be tipped in the bearings 28 so that when the pull on the cord 34 is released the wheel may stand at one side of the wire, as shown in dotted lines $y'$ in Fig. 16, and cut off the current until it is again shifted to contact with the wire. Motor-connections $y^3$ are shown on the trolley-carriers in Figs. 14 and 15. The hoister-frame $v$ is in practice made very narrow beneath the forward truck so that the cord 34 can be pulled downward vertically when re-setting the wheel against the trolley wire.

Fig. 18 shows a special construction for maintaining the tension upon the shifting-rope $x$ and at the same time permitting it to "give" or yield a little when the shifting-drum is actuated to shift the hoister-carriage. This means consists of an arm 36 pivoted to the top bar of the hoister-frame and carrying upon its outer end a riding wheel 37 to rest upon the top of the shifting-rope $x$, and supporting a weight 38 which produces a tension upon such rope by drawing the arm and the wheel 37 downward. This weight is shown operated in connection with a dumping-rope 39 which is extended to the bail 39' of a clam-shell bucket $v^3$ for opening and closing the bucket when desired. The rope 40 for hoisting the bucket is carried over idle-pulleys 41 and 42 to the hoisting-drum $w$, and the dumping-rope is carried over the same idle-pulleys and over a pulley 43, from which it is carried to a dumping-drum $w^2$ which is fitted to turn loosely upon its shaft and controlled solely by a brake-strap 46 and brake-lever 47. From this drum it passes beneath the pulley 44 which carries the weight 38 and over a pulley 45 attached to the arm 36, so that the weight is supported by three plies of the rope. In raising and lowering the bucket $v^3$ the weight 38 falls and rises but only one-third as much as the bucket is moved, the dumping-drum $w^2$ turning idly during such movements. When it is desired to open the bucket the brake is applied to the drum $w^2$ and the lowering of the bucket produces a pull upon the dumping-rope 39 and opens the jaws of the bucket in the usual manner. This weight can be used to keep a tension upon the dumping-rope and thus enable it to be operated with an idle-drum and a brake by suspending the weight from a rigid extension of the top bar of the hoister-frame, as shown in Fig. 1. The weight in such case produces no tension upon the shifter-rope, as it is supported exclusively from the extension bar. Fig. 1 shows the dumping-rope 39 simply carried over the pulley 41 but not connected with the bucket, as a clam-shell bucket is not shown in that figure.

The shifting or conveyer-rope $x$ passes over the pulley 43 and thence downward to the right side of the shifting-drum $w'$ around which it is wrapped several times and then carried upward over the pulley 43 upon its right side and extended to the other end of the track-bars. The turning of the drum $w'$ by the electric motor is effected by any ordinary means and operates to shift the hoister-carriage and all its attachments.

The shoes for the bottoms of the A-frames are preferably made with spherical face 10, as shown in Figs. 3$^a$ and 3$^b$, so as to get the same bearing upon the supporting surface when tipped in various positions, which can not be effected with a flat shoe. The shoe is shown with a flange 11 extended between the lower ends of the channel-bars $i$ and secured therein by rivets 12, with flange 13 extended at the edges of the channel-bars to hold the shoe from displacement independent of the rivets.

Fig. 3 shows an A-frame erected with its feet at the opposite sides of a trench 3, the plank for sheet-piling 4 being shown at opposite sides of the trench and the earth partly removed. As the legs of the A-frame are jointed at the top they can be set as far apart as may be desired, or as close together as restricted conditions may necessitate; the stability of the A-frames in either case being secured by the horizontal tie-bars $p$ and the brace-rods $q$ and $q'$.

To facilitate the driving of the sheet-piling, I provide a series of holes 5 in the legs of the A-frames and secure platform-bars 6 thereon at any desired level, bracing the same by slanting struts 7. The bars 6 and 7 are secured detachably to the legs by bolts 8. The bars 6 project both inside and outside of the frame-legs so that the foot-planks 9 can be laid thereon to support the workman while driving the planks of the sheet-piling 4. As the bars 6 and struts 7 are confined to the A-frames, all the space intermediate to the frames is free and clear for the insertion of the sheet-piling, and the level of the platform upon which the workman stands in driving such piling can be readily changed as the piling is driven, by shifting the platform bars and struts, as shown by the dotted lines 6 and 7 on each of the legs in Fig. 3. The series of holes 5 in the legs is provided to permit such adjustment of the platforms.

With the above construction it will be readily seen that a great length of track-bars is not required for excavating a long trench or to perform any other analogous work, as a short section of the work beneath a given section of the track-bars can be completed, and one or more of the A-frames and track-bars at the rear of such section then taken down and erected at the front end, the shifting-rope and trolley wire being temporarily detached from such rear track-bars and again clamped to the forward end of the track-bars when reërected.

To facilitate the raising and lowering of the A-frames and other parts in such shifting of the sections, I provide the opposite sides of the joint-block 1 in each of the A-frames with strong eyes 2 cast or fixed thereon, to which pulley-blocks or tackle can be attached for use in raising and lowering the adjacent parts. It will therefore be understood that it is not necessary to excavate a great length of trench for laying pipes, building sewers, or other constructive work, but that a suitable number of the sections of track-bars may be erected with the corresponding A-frames, to permit a portion of the trench to be excavated and the earth transported from such portion and dumped upon the ground under the remainder of the track-bars. When the work in such short trench is finished the same earth can be taken up and the trench refilled, thus leaving the ground in advance cleared again to excavate a succeeding portion of the trench.

From the above description it will be seen that the essential feature of the invention is the special construction of the track-bars and their supports by which sections of the track-bars and supports can be removed from one end of the series and applied to the other end, all the other constructive features being adapted to facilitate such shifting of the parts and the operation of the hoisting or conveying appliances carried upon the track-bars.

My special construction can be used for any purpose to which it is adapted, and may be termed an overhead monorail conveyer.

Where an electric motor-carriage is used it obviously requires connection to both poles of the electric generator, and thus necessitates the duplication of the trolley wheels, the trolley wires, and all of their insulators and supports.

Having thus set forth the nature of the invention what is claimed herein is:

1. In a conveyer, the combination, with a series of interchangeable track-bars having opposite flanges $a'$ at the bottom and a truck with wheels fitted to run on the said flanges, with a pivotal connection at the end of each bar beneath the flanges, having its joint at the junction of the said ends, of a series of interchangeable supports, and means for hanging the joints of the track-bars from the supports.

2. In a conveyer, the combination, with a series of interchangeable track-bars having opposite flanges a' at the bottom and a truck having wheels fitted to run on said flanges, the bars having a pivotal connection at each end beneath the bottom flanges, of a series of interchangeable supports, and a pair of hanger-rods with hinge-joints at their ends for hanging the adjacent ends of the track-bars from the supports.

3. In a conveyer, the combination, with interchangeable track-bars, of complemental hinge-lugs upon their opposite ends adapted to interlock with corresponding lugs, and adapted to tip laterally and vertically, and means for holding the said hinge-lugs in engagement.

4. In a conveyer, the combination, with interchangeable track-bars of I-section, of horizontal complemental hinge-lugs applied to the bottom flange of the bars at opposite ends and adapted to engage corresponding hinge-lugs, the lugs being constructed to tip laterally and vertically, and their upper sides set flush with the top of the bottom flange to support the truck-wheels in passing over the joint of the bars, and means applied to the lugs for holding them movably in engagement.

5. In a conveyer and hoister, the combination, with a series of interchangeable track-bars and means for coupling their ends together, of A-frames having each a joint-block and pivoted joint at the top to permit different adjustments of the legs, and hangers connecting the series of joint-blocks with the joints of the track-bars.

6. In a conveyer, the combination, with interchangeable A-frames formed each with a joint-block in the top, of a series of track-bars having complemental hinge-lugs at their opposite ends, means for holding such hinge-lugs in engagement, and two hanger-rods for connecting the joint-block of each A-frame with the connected ends of two track-bars to support them independently at the same level.

7. In a conveyer, the combination, with a series of interchangeable A-frames each having a joint-block at the top, of interchangeable tie-bars for connecting the lower ends of the frames, brace-rods for supporting the frames erectly, and interchangeable track-bars having their joints connected below the joint-blocks of the A-frames and suspended therefrom.

8. A supporting structure for a conveyer, consisting of interchangeable A-frames each having a joint-block at the top, and having plates secured upon its opposite outer sides near the top and bottom, interchangeable tie-bars for connecting the bottom plates, and brace-rods for connecting the upper plates in the alternate sections, and the upper and lower plates in the intermediate sections, whereby the series of A-frames is rigidly supported.

9. An A-frame for a conveyer having each leg formed of two channel-bars, a joint-block connecting the tops of the legs, a shoe applied to the bottom of each leg to rest upon the ground, and brace-plates secured upon the outer sides of the lugs near the top and bottom for connecting tie-bars and brace-rods thereto.

10. In a conveyer, a series of interchangeable A-frames having each a joint-block at its apex, a series of interchangeable tie-bars and brace-rods for holding the frames erect, and the opposite sides of the apex of each A-frame being provided with eyes for connecting tackle thereto, to raise and lower the adjoining frames.

11. An A-frame for a conveyer, having two posts, one provided with a joint-block at the head and the other pivoted upon such joint-block, a transversely bored hole in such joint-block, a bushing forced into such hole and projecting at opposite sides of the block, links hung upon opposite ends of the bushing to support the adjacent ends of suspended track-bars, and a bolt extended through the bushing with nuts for holding the links in place thereon.

12. An A-frame for a conveyer having each leg formed of two channel-bars in the legs, a joint-block connecting the tops of the legs, a shoe with spherical face having a flange secured between the lower ends of the channel-bars, and bolts and thimbles $k'$ for connecting the channel-bars at intermediate points.

13. In a conveyer, the combination, with a series of interchangeable track-bars and interchangeable A-frames with series of holes 5 in the legs, hanger links for suspending the track-bars from the joint-blocks 1, and means for tying and bracing the A-frames erectly, of platform-bars 6 secured detachably upon the legs of the A-frames by bolts 8 in the holes 5 and supported by slanting struts 7, whereby planks for the workmen can be supported at any required distance above the ground.

14. In a conveyer, the combination, with suitable supports and a series of I-shaped track-bars carried thereby, of a hoister-carriage provided with truck-wheels to run upon the track-bars and with an electric motor and hoisting-drum, insulated trolley wheels upon opposite sides of the carriage with electrical connections to the said motor, each of the track-bars having the insulator support 15 secured detachably thereon and carrying insulated clamps 17 at opposite sides of the track-bar and having a stud 21 on the top near each of its opposite ends, the end bars of the series having the flat connector 19 applied to the end studs of the series and provided upon opposite sides of the track-bar with the insulated clamps 14, whereby positive and negative trolley wires can be supported upon the several track-bars to operate with the trolley wheels upon the carriage, and secured detachably in the clamps 14 at the ends of the series.

15. In a conveyer, the combination, with a series of track-bars having opposite flanges $a'$ at the bottom, of the truck forked and provided with the two wheels $h$ in each side to run upon the opposite flanges $a'$ and having a pivot in the bottom parallel with the said flanges, and a hoister-carriage jointed upon said pivot.

16. In a conveyer, the combination, with a series of track-bars having opposite flanges $a'$ at the bottom, and a hoister-carriage having transverse brackets near the opposite ends with a pivot 27 therein, of two trucks forked and provided with the two wheels $h$ in each side to run upon the opposite flanges $a'$, and having each the lug 26 upon the bottom to engage the pin 27.

In testimony whereof I have hereunto set my hand in the presence of two subscribing witnesses.

ASHER LAMBERT.

Witnesses:
  THOMAS S. CRANE,
  T. M. WATSON, Jr.